(12) United States Patent
Chen et al.

(10) Patent No.: US 11,573,194 B2
(45) Date of Patent: Feb. 7, 2023

(54) REFERENCE ELECTRODES INCLUDING SILICONE-CONTAINING POLYMER AND IONIC LIQUID

(71) Applicant: Regents of the University of Minnesota, Minneapolis, MN (US)

(72) Inventors: Xin Chen, Minneapolis, MN (US); Andreas Stein, Minneapolis, MN (US); Philippe Buhlmann, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 118 days.

(21) Appl. No.: 17/095,426

(22) Filed: Nov. 11, 2020

(65) Prior Publication Data

US 2021/0140910 A1 May 13, 2021

Related U.S. Application Data

(60) Provisional application No. 62/933,608, filed on Nov. 11, 2019.

(51) Int. Cl.
*G01N 27/30* (2006.01)
(52) U.S. Cl.
CPC .............................. *G01N 27/301* (2013.01)
(58) Field of Classification Search
CPC .................................................... G01N 27/301
See application file for complete search history.

(56) References Cited

U.S. PATENT DOCUMENTS 8,486,246 B2    7/2013   Kakiuchi et al.
8,608,917 B2    12/2013  Shibata et al.
(Continued)

FOREIGN PATENT DOCUMENTS

WO    WO 2018/096404 A1    5/2018

OTHER PUBLICATIONS

Zhang et al., "Advantages and Limitations of Reference Electrodes with an Ionic Liquid Junction and Three-Dimensionally Ordered Macroporous Carbon as Solid Contact," Anal. Chem., 2012, 84, 7771-7778 (Year: 2012).*

(Continued)

*Primary Examiner* — Alexander S Noguerola
(74) *Attorney, Agent, or Firm* — Mueting Raasch Group (57) ABSTRACT

Reference electrodes that include a solid electron conductor; an interlayer; and a polymeric membrane layer comprising a polymer composition, the polymer composition comprising at least one silicone-containing polymer and at least one ionic liquid, wherein the polymeric membrane layer and the polymer composition are essentially plasticizer free and the silicone-containing polymer and the ionic liquid are miscible as determined using a thermodynamic method that shows a single glass transition temperature ($T_g$) of a composition including the at least one silicone-containing polymer and the at least one ionic liquid, wherein the interlayer is disposed between the solid electron conductor and the polymeric membrane layer. Also disclosed are electrochemical measurement systems including such reference electrodes.

20 Claims, 4 Drawing Sheets

(56) References Cited

U.S. PATENT DOCUMENTS

| | | |
|---|---|---|
| 9,874,539 B2 | 1/2018 | Hu et al. |
| 2006/0065527 A1 | 3/2006 | Samproni et al. |
| 2013/0109790 A1 | 5/2013 | Fukushi et al. |
| 2015/0338367 A1 | 11/2015 | Hu et al. |
| 2019/0195824 A1 | 6/2019 | Speck |

OTHER PUBLICATIONS

Zheng et al., "Ionic Liquids Incorporating Polyamide 6: Miscibility and Physical Properties," Polymers 2018, 10, 562; doi:10.3390/polym10050562 (Year: 2018).*

Zulianai et al., "A liquid-junction-free reference electrode based on a PEDOT solid-contact and ionogel capping membrane," Talanta 125 (2014) 58-64 with Supplementary Information (Year: 2014).*

Ahmad et al., "Role of fumed silica on ion conduction and rheology in nanocomposite polymeric electrolytes," Polymer, 2006; 47(10):3583-3590.

Cha et al., "Electrochemical Performance, Biocompatibility, and Adhesion of New Polymer Matrices for Solid-State Ion Sensors," *Anal. Chem*, 1991; 63:1666-1672.

Chen et al., "Reference Electrodes Based on Ionic Liquid-Doped Reference Membranes with Biocompatible Silicone Matrixes," ACS Sensors, 2020; 5(6):1717-1725.

Heng et al., 'Producing "Self-Plasticizing' Ion-Selective Membranes," *Anal. Chem.*, 2000, 72:42-51.

International Search Report and Written Opinion for International Application No. PCT/US2020/059979, dated Feb. 8, 2021, 9 pgs.

Kakiuchi et al., "New Class of Ag/Agcl Electrodes Based on Hydrophobic Ionic Liquid Saturated with Agcl,"*Anal. Chem.*, 2007; 79:7187-7191.

Kwon et al., "An all-solid-state reference electrode based on the layer-by-layer polymer coating," Analyst, 2007; 132(9):906-921.

Lee et al., "Solvent-Processible Polymer Membrane-Based Liquid Junction-Free Reference Electrode," *Anal. Chem.*, 1998; 70:3377-3383.

Lindner et al., "Electrodes with Ionic Liquid Salt Bridge: When Will These Innovative Novel Reference Electrodes Gain Broad Acceptance?" *ACS Sens*. 2019; 4(3):549-561.

Reinhoudt et al., "Development of Durable $K^+$-Selective Chemically Modified Field Effect Transistors with Functionalized Polysiloxane Membranes," *Anal. Chem*, 1994; 66(21):3618-3623.

Sudholter et al., "Ion-Sensing Using Chemically-Modified Isfets," *Sensors and Actuators*, 1989; 17(1-2):189-194.

Sudholter et al., "Modification of ISFETs by Covalent Anchoring of Poly(Hyroxyethyl Methacrylate) Hydrogel. Introduction of a Thermodynamically Defined Semiconductor-Sensing Membrane Interface," *Anal. Chim. Acta*, 1990; 230 (1):59-65.

\* cited by examiner

REFERENCE ELECTRODES INCLUDING SILICONE-CONTAINING POLYMER AND IONIC LIQUID

RELATED APPLICATIONS

The present application claims the benefit of U.S. Provisional Application No. 62/933,608, filed Nov. 11, 2019, which is incorporated herein by reference in its entirety.

SUMMARY

Disclosed herein are reference electrodes that include a solid electron conductor; an interlayer; and a polymeric membrane layer comprising a polymer composition, the polymer composition comprising at least one silicone-containing polymer and at least one ionic liquid, wherein the polymeric membrane layer and the polymer composition are essentially plasticizer free and the silicone-containing polymer and the ionic liquid are miscible as determined using a thermodynamic method that shows a single glass transition temperature ($T_g$) of a composition including the at least one silicone-containing polymer and the at least one ionic liquid, wherein the interlayer is disposed between the solid electron conductor and the polymeric membrane layer.

Also disclosed are electrochemical measurement systems including such reference electrodes.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of" as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Ion-selective electrodes (ISEs) are of great interest in the context of wearable and implantable sensors for continuous online monitoring of physiologically significant ions, such as $K^+$, $Na^+$, $Cl^-$, and pH ($H^+$), as well as other unrelated uses.

Potentiometric ion-selective sensing systems consist of a working electrode that responds to the ion of interest and a reference electrode that provides an invariant sample-independent reference potential. To integrate these sensors into wearable and implantable devices, both electrodes have to be miniaturized, and they must be built from biocompatible materials.

Conventional reference electrodes used in potentiometry, such as the well-known Ag/AgCl electrode, contact the sample through a salt bridge that contains nearly equitransferrant cations and anions to provide a sample-independent reference potential. However, salt bridges have drawbacks, such as the need for maintenance and the mutual contamination of the bridge electrolyte and sample solution. To address these limitations, reference electrodes that comprise a reference membrane doped with ionic liquids or salts of different hydrophilicity have been proposed. These devices are designed so that the ionic liquid or salt slowly leaches out of the reference membrane and, thereby, establishes a sample-independent distribution potential at the interface of the reference membrane and the sample.

The polymeric membrane material most commonly used in such reference electrodes is plasticized poly(vinyl chloride) (PVC), which has also been very popular for the fabrication of ISE membranes. Plasticizers lower the glass transition temperature ($T_g$) of PVC below room temperature and, thereby, lower the electrical resistance of ion-doped plasticized PVC membranes by many orders of magnitude below that of unplasticized membranes. However, these plasticizers may also gradually leach out of reference and ion-selective membranes, which can be a concern because many of them are known as endocrine disruptors and inducers of inflammatory reactions.

While much effort has been made to replace ISE membranes made of plasticized PVC with plasticizer-free polymers, such as silicones, polyurethanes, polyacrylates, and polymethacrylates, much less attention has been paid to the membrane matrix of ionic liquid based reference electrodes. The use of plasticizer-free polyurethane and poly(n-butyl acrylate) for the preparation of polymeric membrane reference electrodes was reported, but in both cases the membranes were doped with a hydrophobic salt rather than an ionic liquid. To date, the only reference electrodes with a plasticizer-free reference membrane doped with an ionic liquid were fabricated with a poly(vinylidene fluoride-co-hexafluoropropylene) matrix.

Disclosed herein are plasticizer-free silicones as polymer matrixes for reference membranes. Such novel membranes may offer certain advantages: (i) Silicones are widely used in implantable devices, and a range of commercially available silicones have been certified as biocompatible or medical grade following manufacturing standards guided by government agencies, such the US Food and Drug Administration. (ii) Silicones typically have a very low $T_g$, which is a prerequisite for use in ISE and reference membranes. (iii) Silicone precursors can be easily dissolved and cast into thin films. (iv) The curing chemistry of silicones offers an opportunity to covalently attach reference membranes to a range of substrates with surface hydroxyl groups to prevent membrane delamination.

Disclosed herein are polymeric reference electrode membranes prepared by solvent casting from seven (7) commercially available biocompatible silicones that are widely used in implantable devices. Reference electrodes with membranes consisting of poly(3,3,3-trifluoropropylmethylsiloxane) (Fluorosilicone 1) and one of several 1-methyl-3-alkyllimidazolium bis(trifluoromethylsulfonyl)imide ionic liquids provided a stable and sample-independent potential in electrolyte solutions spanning the range of electrolyte concentrations in human blood, with more hydrophobic ionic liquids performing better. Over 8 days at 37° C. in artificial blood electrolyte solutions, the reference membranes doped with 1-methyl-3-octylimidazolium bis(trifluoromethylsulfonyl)imide exhibited a potential drift as low as 20 µV/h. In 10% animal serum, a 112 µV/h drift was observed over 5.8 days. Also disclosed herein are silicone materials doped with an ionic liquid that either failed to form self-standing membranes or did not provide a sample-independent potential in the ionic concentration range tested. In case of the functional reference electrodes, differential scanning calorimetry confirmed good miscibility between the ionic liquid and the polymer matrix, whereas the poor miscibility of four polymer matrixes and the ionic liquids—as confirmed by differential scanning calorimetry—correlated with an undesirable sample dependence of the reference potential.

Figure 1:
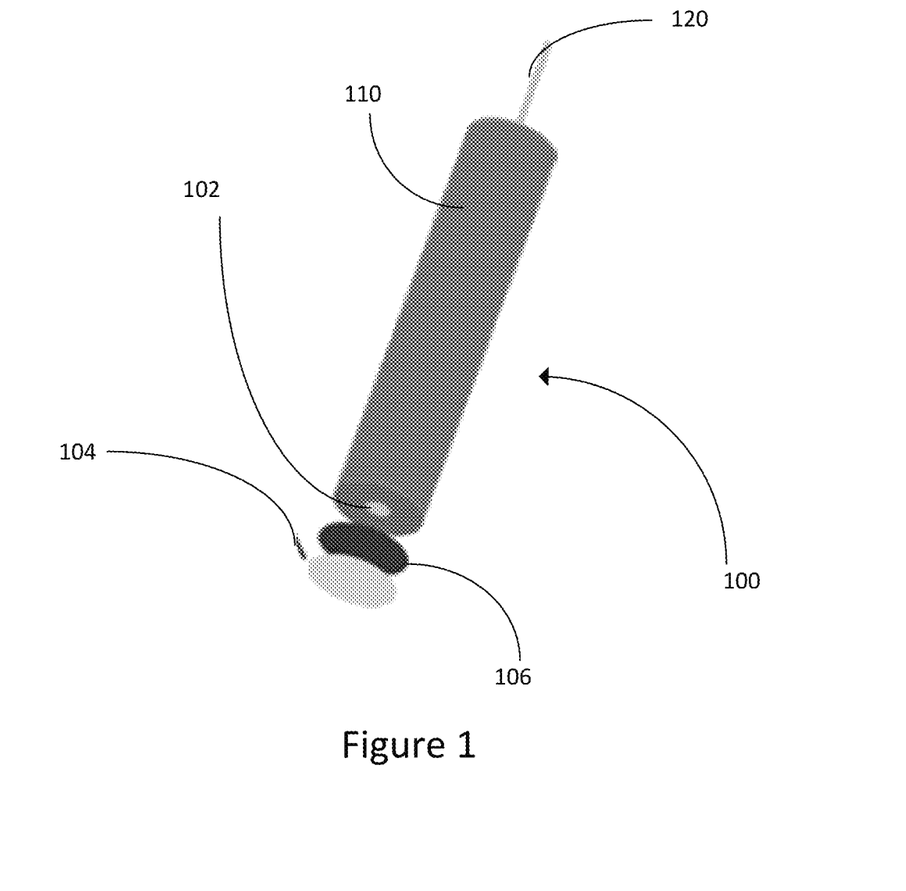
FIG. 1 is a schematic depiction of an illustrative reference electrode.
Figure 2:
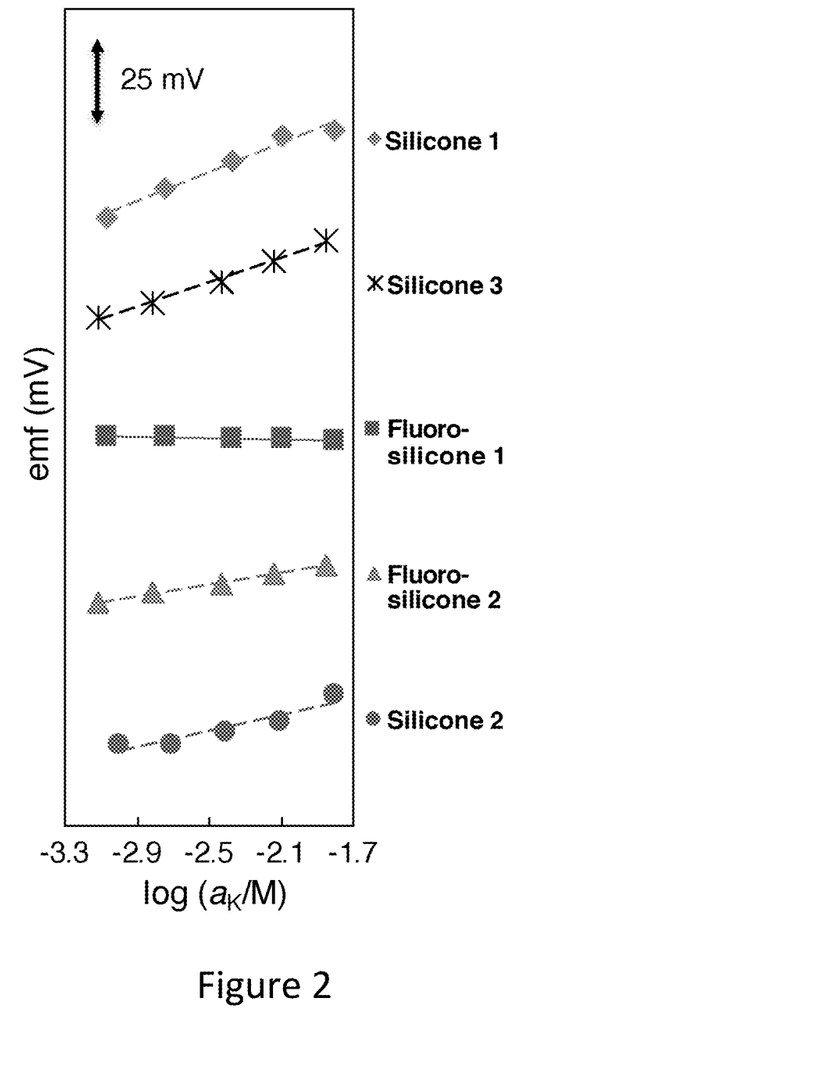
FIG. 2 shows the effect of KCl (1.0 to 16 mM) on the potential of reference electrodes with [$C_8mim^+$][$NTf_2^-$]-doped silicone membranes (conventional electrode setup with a 1.0 mM KCl inner filing solution), as measured against a free-flow double-junction reference electrode.

FIG. 1 is a schematic of an illustrative embodiment of a reference electrode described herein. The reference electrode 100 includes solid electron conductor 102 at the distal end. Electrode 100 also includes membrane 104 and interlayer 106. Interlayer 106 is disposed between conductor 102 and membrane 104. In some embodiments, solid electron conductor 102 can be a disk, for example, a gold disk. Electrode 100 may also include electrode body 110. Electrode body 110, conductor 102, interlayer 106, membrane 104 may all be housed in an optional housing (not pictured herein) that would be positioned around the electrode body 110. A screw cap would also be included with the optional housing, which when fastened to the housing would bring the components of the electrode into operable contact. Electrode 100 can also include electrode connector 120 connecting conductor 102 to a recording device, processor, or computer that can record the information from the reference electrode 100.

The size and/or shape of the electrodes can vary depending on the specific use and all are within the scope of this invention. The electrodes may be configured for home or point-of-care use, for use at a hospital, clinic, or other similar settings. This may include miniaturization of the electrodes. The electrodes, for example, can be a planar device in which the solid electron conductor, an interlayer comprising mesoporous carbon, and a membrane are applied as consecutive layers on an inert substrate, such as plastic, silicon, or paper. The electrodes may be paper-based systems. These paper-based systems may be disposable and miniaturized.

The solid electron conductor 102 can include a variety of conducting materials. Illustrative conducting materials include gold, silver, platinum, copper, stainless steel, carbon, indium-tin-oxide (ITO), fluorine-doped tin oxide (FTO), aluminum and the like. In some embodiments, the solid electron conductor 102 can include gold, platinum, copper, stainless steel, carbon, indium-tin-oxide (ITO), fluorine-doped tin oxide (FTO), aluminum and the like. In some embodiments, the solid electron conductor can include gold. In some embodiments, the solid electron conductor can include a gold disk. The thickness and the diameter of the conductor can vary. The gold disk, for example, can have a diameter of between about 0.5 mm and about 5 mm. Diameters outside of this range are also within the scope of this disclosure. In some embodiments, the diameter of the gold disk can be about 2 mm.

Illustrative materials for use in the interlayer 106 can include, for example, carbon, conductive polymers, metal nanoparticles and nanostructures. In some embodiments, the interlayer 106 can include conducting polymers such as poly(3,4-ethylenedioxythiophene) (PEDOT), poly(3-ocylthiophene) (POT), polypyrrole, or polyaniline. In some embodiments, the interlayer 106 can include three-dimensionally ordered microporous (3DOM) carbon, CIM carbon, carbon nanotubes, graphene, fullerene, or porous carbon spheres, gold nanoporous films, gold nanoparticles, platinum nanoparticles supported on carbon black.

The membrane 104 included in the electrode 100 can generally be described as biocompatible polymeric membranes that can more specifically be described as a plasticizer-free silicone-containing polymer matrix that contains an ionic liquid. The polymeric membrane can be formed from a polymer composition that includes at least one silicone-containing polymer composition and at least one ionic liquid. Both the polymeric membrane and the polymer composition can be described as plasticizer free or essentially plasticizer free. By plasticizer free, it is meant that the polymeric membrane or the polymer composition has less than 5 wt % plasticizer, less than 1 wt % plasticizer, or less than 0.1 wt % plasticizer free. In some embodiments, the amount of plasticizer can be determined by soaking the membrane (e.g., the polymer composition) in an organic solvent in order to leach the plasticizer from the membrane and then analyze the solvent using high pressure liquid chromatography (HPLC). In some embodiments, differential scanning calorimetry (DSC) can be utilized. To calculate wt % from a DSC-determined $T_g$, the Fox equation is used $1/T_g = w^1/T_g^1 + w^2/T_g^2$.

The silicone-containing polymer composition and the ionic liquid are miscible with each other. Whether or not the silicone-containing polymer and the ionic liquid are miscible with each other can be determined using a thermodynamic method that shows a single glass transition temperature ($T_g$) of a composition including only the at least one silicone-containing polymer and the at least one ionic liquid containing the silicone-containing polymer. Illustrative thermodynamic methods of determining a single $T_g$ can include differential scanning calorimetry (DSC), thermogravimetric analysis (TGA), scanning electron microscopy (SEM), thermal mechanical analysis (TMA), dynamic mechanical analysis (DMA), and dielectric thermal analysis (DETA) for example. In some embodiments, DSC can be utilized.

Illustrative ionic liquids can include, for example, those that include an imidazolium cation or quaternary ammonium cation group; and an anion comprising a bis(perfluoroalkylsulfonyl)imide, an alkyl(perfluoroalkyl)sulfonylimide, a bis(alkylsulfonyl)imide, or a bis(alkylsulfonyl)imide with one or more ether, ester or amide groups interrupting the alkyl chain. More specific examples can include, for example, 1-methyl-3-octylimidazolium bis(trifluoromethylsulfonyl)imide ($[C_8mim^+][NTf_2^-]$), 1-methyl-3-decylimidazolium bis(trifluoromethylsulfonyl)imide ($[C_{10}mim^+][NTf_2^-]$), 1-methyl-3-dedecylimidazolium dodecylimidazolium bis(trifluoromethylsulfonyl)imide ($[C_{12}mim^+][NTf_2^-]$), tributylmethylammonium bis(trifluoromethylsulfonyl)imide ($[NBu_3Me^+][NTf_2^-]$), and combinations thereof.

The amount of the ionic liquid in useful polymer compositions can vary. For example, in some useful polymer compositions, the amount of the ionic liquid can be at least 5 wt % or at least 10 wt % based on the total weight of the polymer composition. For example, in some useful polymer compositions, the amount of the ionic liquid can be not greater than 75 wt %, not greater than 50 wt %, not greater than 40 wt %, or not greater than 30 wt % based on the total weight of the polymer composition.

In some embodiments, useful silicone-containing polymers can have a glass transition temperature ($T_g$) that is lower than room temperature. In some embodiments, useful silicone-containing polymers can be polysiloxane based polymers. More specific descriptions of useful silicone-containing polymers can include polysiloxane-based fluorine-containing polymers, polysiloxane-based methyl group-containing polymers, polysiloxane-based cyano group-containing polymers, or combinations thereof. In some embodiments, a useful polymer can include, for example, poly([3,3,3-trifluoropropyl]methylsiloxane).

The amount of the silicone-containing polymer in the polymer composition can vary. For example, in some useful polymer compositions, the amount of the silicone-containing polymer can be at least 5 wt %, or at least 10 wt % based on the total weight of the polymer composition. For example, in some useful polymer compositions, the amount of the silicone-containing polymer can be not greater than 50 wt %, not greater than 40 wt %, or not greater than 30 wt % based on the total weight of the polymer composition.

The polymer composition can also include optional components such as inorganic fillers, solvents, or hydrophobic salts. Illustrative inorganic fillers can include, for example silica and titanium dioxide. Illustrative solvents can include, for example tetrahydrofuran (THF), dioxane, dichloromethane (DCM), acetone, dimethylformamide (DMF), chloroform, ethyl acetate (EA), cyclohexane, dimethylsulfoxide, or the combination of two or more.

In order to form a membrane from a polymer composition, various well known methods can be utilized. In some embodiments, useful illustrative methods can include, for example, solvent casting, spin-coating, dip-coating, or ink-jet-printing.

Useful reference electrodes can include those that provide sample-independent and long-term stable electric potential in the range of ion concentrations regularly found in saliva, urine, interstitial fluid, blood, blood serum, or sweat at room or body temperature, for example.

The present description also includes an electrochemical sensor system or an electrochemical measurement system. The electrochemical sensor system components include reference electrodes as described herein as well as ion sensitive electrodes (ISEs). In some embodiments, the electrochemical system can also include optionally 2, 3 or 4 electrodes, a workstation, a processor, or any combinations thereof. The electrochemical sensor system components may also include a work station, power source, sample holder, computer and/or recorder with optionally a display. The recording device and/or computer can record and/or compute the amount or concentration of an analyte in a sample. The components of the electrochemical sensor systems may be integral within the system, i.e., housed together, or they may be separate components that can be electrically connected to form the electrochemical sensor systems.

The electrochemical sensor system may be configured to be, for example, a potentiometric sensor, an ion-sensitive field effect transistor, a voltammetric sensor, an amperometric sensor, a coulometric sensor or an impedance sensor. A general electrochemical measurement system can include, for example, an electrochemical workstation that can be connected to a plurality of electrodes. The electrochemical workstation may be connected to two, three, or four electrodes. All of the electrodes can be in contact with the sample. In one exemplary embodiment with a potentiometric system, a reference and sensing electrode are connected to the workstation, which is referred to as a potentiometer. In an embodiment with a voltammetric system, a reference, an auxiliary, and a sensing electrode are connected to the workstation. Impedance measurements can be performed with two, three, or four electrodes. Other components known in the art may also be present and may also be part of the electrochemical system, and all are within the scope of the present description.

The present description includes paper-based sensing devices. The paper-based devices can be disposable and may be potentiometric sensing devices. A variety of ions or analytes in samples can be detected in the paper-based devices as described above for the ion-selective electrodes including, for example, $H^+$, $Li^+$, $Na^+$, $K^+$, $Mg^{2+}$, $Ca^{2+}$, $Cu^{2+}$, $Ag^+$, $Zn^{2+}$, $Cd^{2+}$, $Hg^{2+}$, $Pb^{2+}$, $NH_4^+$, carbonate, bicarbonate, nitrate, nitrite, sulfide, chloride, iodide, and the like, as well as organic anions and cations such as heparin, protamine, and the like. The ISE can be stencil-printed Ag/AgCl electrode.

The present description includes a method for measuring analytes in a sample. The analytes are generally ions in a sample. The ions may be in natural substances or synthetic substances. The samples can be clinical samples, environmental samples, industrial samples, forensic samples, agricultural samples, and the like. Clinical samples can include samples generated in hospitals, clinics, in point-of-care scenarios such as home or other settings. Clinical samples can be from healthy individuals or individuals with medical issues. The samples may be liquid or gas samples. If the sample is a gas, the electrochemical sensor may be or may not be separated from the sample by a gas-permeable membrane.

Methods of using devices including disclosed reference electrodes, methods of obtaining measurements, other similar methods, or combinations of such methods can be similar to those disclosed in U.S. Pat. No. 9,874,539, the disclosure of which is incorporated herein by reference thereto.

The present disclosure is further illustrated by the following examples. It is to be understood that the particular examples, assumptions and procedures are to be interpreted broadly in accordance with the scope and spirit of the disclosure as set forth herein.

EXAMPLES

Materials. Reagents and materials were obtained from the following sources: Dow RTV 730 fluorosilicone (Fluorosilicone 1) and RTV 3140 silicone (Silicone 1) from Dow Corning (Midland, Mich.); NuSil silicones MED-1555 (Fluorosilicone 2), MED-2000 (Silicone 2), MED-6381 (Silicone 3), MED-6385 (Silicone 4), and GEL-3500 (Silicone 5) from NuSil (Carpinteria, Calif.); high molecular weight PVC and o-nitrophenyl octyl ether (o-NPOE) from Fluka (Buchs, Switzerland); the ionic liquids 1-methyl-3-octylimidazolium bis(trifluoromethylsulfonyl)imide ($[C_8mim^+][NTf_2^-]$), 1-methyl-3-decylimidazolium bis(trifluoromethylsulfonyl)imide ($[C_{10}mim^+][NTf_2^-]$), 1-methyl-3-dedecylimidazolium bis(trifluoromethylsulfonyl)imide ($[C_{12}mim^+][NTf_2^-]$), and tributylmethylammonium bis(trifluoromethylsulfonyl)imide ($[NBu_3Me^+][NTf_2^-]$) from Iolitec (Tuscaloosa, Ala.); valinomycin from Sigma-Aldrich (St. Louis, Mo.); sodium tetrakis[3,4-bis-(trifluoromethyl)phenyl]borate (NaTFPB) from Dojindo (Kumamoto, Japan). Colloid-imprinted mesoporous (CIM) carbon was prepared as previously reported.[39] Autonorm freeze-dried animal serum was purchased in powder form from Sero (Billingstad, Norway). All chemicals were used as received. Aqueous solutions were prepared from deionized water treated with a Milli-Q Plus water system (Millipore, Bedford, Mass.) to give a resistivity of 18.2 MΩ/cm.

Electrode Fabrication. In the case of one-component silicone materials (Fluorosilicone 1, Silicone 1, Fluorosilicone 2, Silicone 2), solutions to prepare reference electrode membranes were prepared by dissolving 200 mg of the silicone material and 50 mg ionic liquid in 1.0 mL tetrahydrofuran (THF) and stirring with a magnetic stir bar. Then the membrane solution was poured into a circular Teflon Petri dish of 25 mm diameter and left to allow for solvent evaporation and silicone curing. In the case of silicone materials with either only a separate catalyst (Silicone 4) or both a separate catalyst and a separate crosslinker (Silicone 3), a combined amount of 200 mg of the different components in the recommended ratios was used. The base (i.e., the linear polysiloxane) and (if applicable) the crosslinker were dissolved in 1.0 mL THF, followed by stirring, casting of the solution into a Teflon Petri dish of 25 mm diameter, and addition of catalyst into the cast solution right afterwards. In the case of the adjustable two-component Silicone 5, a total amount of 200 mg with a 1:1 mass ratio was used. Both components were dissolved in 1.0 mL THF and cast into a Teflon Petri dish of 25 mm diameter. After complete curing of the silicones, small circular disks (7 mm diameter) were cut from the master membranes and mounted into Philips type electrode bodies[40] (Glasbläserei Möller, Zürich, Switzerland; Ag/AgCl internal reference) with a 1.0 mM KCl inner filling solution. The electrodes were conditioned in 1.0 mM KCl for two days prior to use.

For the preparation of solid-contact reference electrodes, gold electrodes (planar circular Au electrodes with a 2 mm diameter, embedded into an inert Kel-F polymer shaft; CH Instruments, Austin, Tex.) were polished on a polishing cloth, first with 0.5 μm and then with 0.03 μm aqueous aluminum oxide slurry (Buehler, Lake Bluff, Ill.), and then sonicated first in water and then in ethanol, each for 6 min. A stream of argon was used to dry the electrodes. A CIM carbon suspension solution was prepared by dissolving 47.5 mg CIM carbon and 2.5 mg Fluorosilicone 1 in 1.0 mL THF followed by sonication for 30 min. Then, 30 μL of this suspension was dropcast onto the gold electrode and left to dry. This was followed by two aliquots (20 μL followed by 30 μL) of silicone membrane solution dropcast onto the CIM carbon layer. After complete curing of the silicones, the electrodes were conditioned for two days in 1.0 mM KCl solution prior to use. A water layer test using $K^+$-selective Fluorosilicone 1 solid-contact electrodes showed no undesired water layer between Fluorosilicone 1 and the solid contact material.

Solutions for the preparation of ionic liquid-doped PVC membranes were prepared by dissolving 100 mg high molecular weight PVC, 100 mg of the plasticizer o-NPOE, and 50 mg $[C_8mim^+][NTf_2^-]$ in 1.0 mL THF. Solutions for the fabrication of blank plasticized PVC membranes were prepared by dissolving 100 mg high molecular weight PVC and 100 mg of the plasticizer o-NPOE in 1.0 mL THF. In both cases, the solutions were stirred until the PVC had completely dissolved and then poured into a glass Petri dish of 22 mm diameter and left to dry over 24 h to give a plasticized PVC membrane.

Electrochemical Measurement. Potentiometric measurements were performed with a 16-channel potentiometer (Lawson Labs, Malvern, Pa.) controlled by EMF Suite software (Fluorous Innovation, Arden Hills, Minn.). Potential responses of all polymeric membrane reference electrodes were measured in stirred solutions against a conven- tional free-flow double junction reference electrode (DX200, Mettler Toledo, Switzerland; AgCl saturated 3.0 M KCl as inner reference electrolyte and 1.0 M LiOAc as bridge electrolyte). Unless mentioned otherwise, all measurements were performed at room temperature (20° C.). For KCl calibrations, measurements began at 1.0 mM KCl, and aliquots of concentrated KCl solutions were added to double the concentration stepwise to 16 mM. All emf values were corrected for the liquid junction potentials of the double-junction reference electrode. Activity coefficients were calculated based on a two parameter Debye-Hückel approximation. Membrane resistances were measured with the known shunt method.

Differential Scanning calorimetry. Cast membranes were left to dry for at least two weeks prior to DSC experiments to ensure that the membranes were fully cured, and all solvent had evaporated. Experiments were performed with a TA Instrument Q1000 DSC (New Castle, Del.) with a liquid nitrogen cooling system. Small pieces of samples were cut from the master membranes and enclosed in a lidded sample pan. They were first thermally equilibrated at 40° C. for one minute. Then the samples were scanned to −180° C. and back to 40° C., with a consistent 1.0° C./min heating and cooling rate. Glass transition temperatures were determined as midpoints of transition zones.

Results and Discussion

Silicone Materials and Sensor Membrane Fabrication. Seven commercially available silicones were used in this work. Fluorosilicone 1, Fluorosilicone 2, Silicone 1, and Silicone 2 are so-called one-component silicones. Once exposed to air, they cure upon reaction with water from the atmosphere, releasing either an alcohol or acetic acid as byproduct. Typically, they contain an organotin catalyst to facilitate this reaction (see Scheme 1). The three other silicone materials used in this work were prepared by mixing multiple components. Silicone 4 is prepared from two components. One of these components contains a tin catalyst and is used in a few weight percent with respect to the other component, which contains the linear polysiloxane backbone and crosslinker. In the case of Silicone 3, the crosslinker is provided separately as a third component. In the case of Silicone 5, the two components are added in a 1:1 ratio. Curing occurs upon mixing of the two or three components in a ratio recommended by the manufacturer (see Electrode Fabrication). From a fabrication point of view, one-component silicones are advantageous as their use reduces the number of fabrication steps and eliminates the need to control the ratio of multiple components.

Scheme 1. Curing chemistries of representative fluorosilicones and silicones studied in this work (see also Table 1).

Fluorosilicone 1: R = vinyl
Fluorosilicone 2: R = methyl, ethyl

Silicone 3

Even though the exact structures of these silicones differ from each other in a number of ways, their linear backbones are either poly(3,3,3-trifluoropropylmethylsiloxane) (Fluorosilicone 1 and Fluorosilicone 2, referred to in the following as fluorosilicones) or poly(dimethylsiloxane) (Silicone 1, Silicone 2; Silicone 3, Silicone 4, and Silicone 5). Many silicone materials also contain fillers such as silica or titanium dioxide to improve their mechanical properties (see Table 1). Some of these fillers can be removed by centrifugation if that is desired for sensing purposes.

The electrical resistances of blank silicone membranes that were not doped with an ionic liquid all fall into the relative narrow range of 0.2 to 2.0 GΩ, except for Silicone 1 (15 GΩ). These resistances are very high, but they are not infinite as it would be expected for an ideal material without ionic impurities. This suggests that the different silicone materials have low levels of intrinsic ionic impurities. Notably, there is no evident correlation between membrane resistances and the type of silicone.

Casting of Silicone 3 gave self-standing membranes in both its pure form and when doped with 20 wt % [$C_8mim^+$][$NTf_2^-$]. However, when Silicone 3 was doped with 20 wt % [$C_8mim^+$][$NTf_2^-$], clear liquid aggregates with average sizes of 1 to 2 mm diameter macro-phase separated from the polymer, as could be readily detected with the naked eye. In three attempts to cast such membranes, varying patterns and shapes of liquid aggregates appeared. Areas were randomly selected for cutting out smaller circular disks for use in electrodes. Casting of the two-component Silicone 4 and Silicone 5 did not give self-standing membranes, independently of whether it was in a pure form or doped with 20 wt % [$C_8mim^+$][$NTf_2^-$].

TABLE 1

Characteristics of Reference Electrode Membranes.

| Membrane matrix | Silicone type | Polymer backbone | Biocompatibility | Resistance (doped with [C$_8$mim$^+$][NTf$_2^-$])/MΩ[a] | Fillers |
|---|---|---|---|---|---|
| Fluorosilicone 1 | 1 component, acetic acid evolving | poly[(3,3,3-trifluoropropyl)methylsiloxane], OH-terminated [b] | no plasticizer | 4.7 ± 4.0 | titanium dioxide, silica |
| Fluorosilicone 2 | 1 component, acetic acid evolving | poly[(3,3,3-trifluoropropyl)methylsiloxane], OH-terminated | medical grade [c] | 8.0 ± 2.7 | silica |
| Silicone 1 | 1 component, alcohol evolving | poly(dimethylsiloxane), OH-terminated | no plasticizer | (7.1 ± 7.9) × 10$^3$ | silica |
| Silicone 2 | 1 component, acetic acid evolving | n.a. [d] | medical grade [c] | (4.9 ± 6.5) × 10$^3$ | silica |
| Silicone 3[e] | 3 components (base, crosslinker, Sn catalyst) | poly(dimethylsiloxane), OH-terminated | medical grade [c] | 160 ± 120 | none |
| Silicone 4[f] | 2 components (base, Sn catalyst) | n.a.[d] | medical grade [c] | n.a. | silica |
| Silicone 5[g] | 2 components, Pt catalyst | poly[dimethylsiloxane-co-(3,3,3-trifluoropropyl)methylsiloxane], vinyl-terminated | no plasticizer | n.a. | none |
| Plasticized PVC | n.a. | poly(vinyl chloride) | plasticizer required | 0.59 ± 0.08[h] | none |

[a] Electrical resistance of membranes doped with 20 wt % [C$_8$mim$^+$][NTf$_2^-$] (n = 4).
[b] Numerical locants of fluorines inferred from Chemical Abstract number; material data safety sheet only specifies trifluoropropyl.
[c] Medical grade for intended use in, on, or in contact with the body, according to regulatory standards: Current Good Manufacturing Practice 21 Code of Federal Regulations § 820 (Device) and § 210-211 (Drug/Active Pharmaceutical Ingredient) from the US Food and Drug Administration and ISO 9001 from the International Organization for Standardization.[45]
[d] Exact structure not available from manufacturer.
[e] Membranes doped with 20 wt % [C$_8$mim$^+$][NTf$_2^-$] contained liquid aggregates.
[f] Silicone 4 Membrane does not form robust self-standing membranes.
[g] At the 1:1 component ratio recommended by the manufacturer, Silicone 5 does not form robust self-standing membranes.
[h] n = 4.

Responses to KCl of Reference Electrode Membranes Doped with [C$_8$mim$^+$][NTf$_2^-$]. The response mechanism of reference electrodes with ionic liquid-doped reference membranes relies on the control of the phase boundary potential at the membrane-sample interface by distribution of the ionic liquid between the two phases. Sample ions most likely to negatively affect the reference potential have a comparatively small hydration energy, which lowers the energy barrier for transfer into the reference membrane. Considering physiological ion concentrations in human blood serum and typical ion transfer energies, as apparent, e.g., from the selectivity of ionophore-free ion exchanger ISEs, one of the ions of most concern is potassium, which has a mean concentration of 4.10 mM in human blood serum of healthy adults (95% range: 3.5 to 4.7 mM).

In order to assess whether potassium affects the ideally sample-independent response of reference electrodes with ionic liquid doped silicone membranes, the use of these electrodes was tested in the KCl concentration range from 1.0 to 16 mM. When doped with [C$_8$mim$^+$][NTf$_2^-$], only reference electrode membranes based on the Fluorosilicone 1 matrix provided a sample-independent potential. The other silicone materials (Silicone 1, Fluorosilicone 2, Silicone 2, and Silicone 3) did not give reference potentials independent of the KCl concentration. Given the similar polarities of all of these silicone and fluorosilicone matrixes, it appears unlikely that differences in the free energies of transfer of K$^+$ or Cl$^-$ from aqueous samples into the reference membranes explain these results alone. Indeed, the electrical resistance of the silicones doped with [C$_8$mim$^+$][NTf$_2^-$] and the DSC results suggest that the poor miscibility between the ionic liquid and the silicone polymer is the major cause for the poor performance as reference electrode membranes.

Functionality of Reference Electrodes and Miscibility of Ionic Liquids with Silicone Materials. Because Fluorosilicone 1 doped with [C$_8$mim$^+$][NTf$_2^-$] emerged as the most successful matrix for reference electrodes, we used DSC to further characterize this material. For comparison, we also used DSC to test the pure ionic liquid as well as undoped and [C$_8$mim$^+$][NTf$_2^-$]-doped membranes with polymer matrixes consisting of Fluorosilicone 2, Silicone 1, Silicone 2, or Silicone 3. Table 2 summarizes the glass transition temperatures determined from the DSC traces.

TABLE 2

Glass Transition Temperatures of the Ionic Liquid [C$_8$mim$^+$][NTf$_2^-$], Neat Polymers, and [C$_8$mim$^+$][NTf$_2^-$]-Doped Polymers.

| Material | Undoped (° C.) | Doped with 10 wt % [C$_8$mim$^+$][NTf$_2^-$] (° C.) | Doped with 20 wt % [C$_8$mim$^+$][NTf$_2^-$] [b] (° C.) |
|---|---|---|---|
| [C$_8$mim$^+$][NTf$_2^-$] | −84[a] | n.a. | n.a. |
| Fluorosilicone 1 | −67 | −66 | −66 and −83[b] |
| Fluorosilicone 2 | −67 | −67 and −83[b] | −67 and −82[b] |
| Silicone 1 | −117 | −117 and −84[b] | −116 and −84[b] |

TABLE 2-continued

Glass Transition Temperatures of the Ionic Liquid [C$_8$mim$^+$][NTf$_2^-$], Neat Polymers, and [C$_8$mim$^+$][NTf$_2^-$]-Doped Polymers.

| Material | Undoped (° C.) | Doped with 10 wt % [C$_8$mim$^+$][NTf$_2^-$] (° C.) | Doped with 20 wt % [C$_8$mim$^+$][NTf$_2^-$] [b] (° C.) |
|---|---|---|---|
| Silicone 2 | −120 | −120 and −82[b] | −119 and −83[b] |
| Silicone 3 | −117 | −118 and −83[b] | −121 and −81[b] |
| Plasticized PVC | −54 | n.a. | −56 |

[a]T$_g$ of pure [C$_8$mim$^+$][NTf$_2^-$].
[b]Two glass transitions observed, one corresponding to pure [C$_8$mim$^+$][NTf$_2^-$].

At 10 wt % doping with [C$_8$mim$^+$][NTf$_2^-$], Fluorosilicone 1 only shows one T$_g$ at −66° C., which coincides within error with the T$_g$ of undoped Fluorosilicone 1 at −67° C. This indicates that at this doping level, the ionic liquid and Fluorosilicone 1 are fully miscible. When the doping level is increased to 20 wt %, an additional T$_g$ consistent with the ionic liquid appears, which is a clear sign for phase separation. This confirms that the miscibility of [C$_8$mim$^+$][NTf$_2^-$] in Fluorosilicone 1 is at least 10 wt % and is consistent with the electrical resistance of these membranes, which is two orders of magnitude lower than for undoped Fluorosilicone 1.

For all other fluorosilicone and silicone matrixes studied by DSC, even at the low doping level of 10 wt % the DSC trace shows two glass transitions, one corresponding to the T$_g$ of the pure ionic liquid, and the other corresponding to the T$_g$ of the undoped polymer, indicating phase separation. Moreover, addition of [C$_8$mim$^+$][NTf$_2^-$] to these membrane matrixes has within error no effect on the membrane resistance, except for the case of Fluorosilicone 2. Although [C$_8$mim$^+$][NTf$_2^-$] and Fluorosilicone 2 are not fully miscible at the 10 wt % doping level, the amount of dissolved [C$_8$mim$^+$][NTf$_2^-$] was sufficient to lower the membrane resistance to some extent. All of this is consistent with a poor miscibility between [C$_8$mim$^+$][NTf$_2^-$] and these polymers and the poor performance of these matrixes as reference membranes.

For comparison, DSC tests were also performed with [C$_8$mim$^+$][NTf$_2^-$]-doped PVC membranes plasticized with o-NPOE. At the doping level of 20 wt %, which is the weight ratio that was used in prior work,[23] the plasticized PVC membranes exhibited only one T$_g$. Moreover, doping of the plasticized PVC membrane with [C$_8$mim$^+$][NTf$_2^-$] lowered the membrane resistance to 0.59 MΩ, consistent with a high solubility of the ionic liquid in the plasticized PVC matrix.

Based on these DSC and resistance data, we conclude that the poor performance of many of the Fluorosilicone 2, Silicone 1, Silicone 2, and Silicone 3 membranes doped with ionic liquid is primarily explained by the low solubility of the ionic liquid in the polymer matrix, which results in a high electrical resistance but may also affect the amount of ionic liquid distributed across the membrane/sample phase boundary.

Effect of Sample Concentration on Solid-Contact Reference Electrodes with Fluorosilicone 1 Membranes. In view of the results obtained with conventional electrode bodies with an inner filling solution as discussed above, only Fluorosilicone 1 was used for subsequent work with solid-contact reference electrodes. CIM carbon, a hydrophobic, highly pure carbon material with a high surface area (321 m$^2$/g) and a low surface concentration of polar functional groups (0.053 mmol/m$^2$ ketone groups; phenol, lactone, lactol, and carboxylic acid group concentrations too low to detect) was used as transducer layer between the reference membrane and gold as the underlying electron-conducting metal. In the 1.0 mM to 16 mM KCl range, solid-contact Fluorosilicone 1 reference electrodes showed a sample-independent emf response, with an emf dependence on the logarithm of the K$^+$ activity of 0.0±0.7 mV/decade (n=3). The difference between the maximum and minimum potentials over the entire activity range was 2.0±1.4 mV (n=3). This demonstrates that the good characteristics of Fluorosilicone 1 reference membranes carry over to the solid-contact setup with CIM carbon as transducer.

Figure 3:
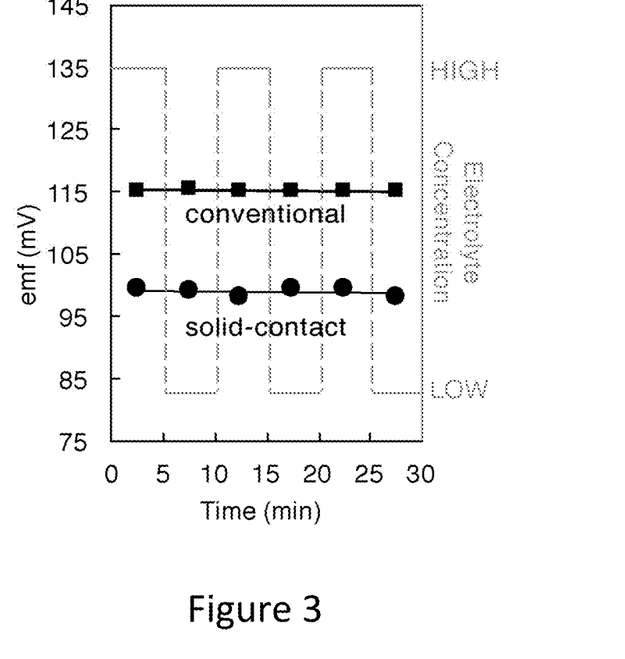
FIG. 3 shows the potential responses of [$C_8mim^+$][$NTf_2^-$]-doped Fluorosilicone 1 reference electrodes to artificial blood electrolyte solutions of high and low concentrations (see Table 3 for the composition of test solutions). Solid contact electrodes were prepared with CIM carbon as transducer layer, and conventional electrode bodies contained 1.0 mM KCl inner filling solution. Potentials were measured against a free-flow double-junction reference electrode. The average slopes of conventional electrodes and solid-contact electrodes are $-0.01\pm0.00_2$ mV/decade (n=3) and $-0.1\pm0.2$ mV/decade (n=3), respectively.

To simulate the working environment of wearable or implantable sensors, electrolyte solutions mimicking critical blood parameters in terms of pH and K$^+$, Na$^+$, Cl$^-$, and phosphate concentrations were used. Specifically, two such electrolyte solutions, designated below as HIGH and LOW, were prepared (see Table 3 for their composition) to represent unusually high and low blood electrolyte concentrations. FIG. 3 confirms that Fluorosilicone 1 reference electrodes provide the same potential in HIGH and LOW solutions.

TABLE 3

Composition of Artificial Blood Electrolyte Solutions and Potential Stability Characteristics of Reference Electrodes with [C$_8$mim$^+$][NTf$_2^-$]-doped Fluorosilicone 1 Membranes Tested in Artificial Blood Electrolyte Solutions.

| Electrolyte | HIGH (mM) | LOW (mM) |
|---|---|---|
| KCl | 4.7 | 3.5 |
| NaCl | 102.8 | 96.4 |
| Na$_2$HPO$_4$ | 0.82 | 0.74 |
| NaH$_2$PO$_4$ | 0.18 | 0.26 |
| pH | 7.45 | 7.35 |

Figure 4:
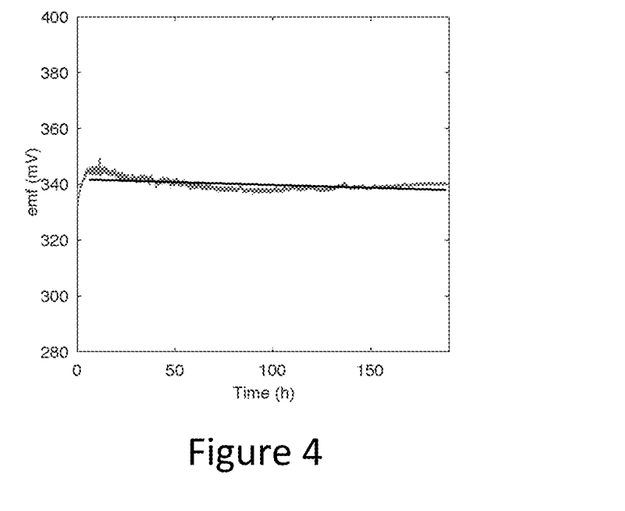
FIG. 4 shows the long term emf as observed with a [$C_8mim^+$][$NTf_2^-$]-doped Fluorosilicone 1 solid-contact reference electrode immersed into artificial blood electrolyte solutions (a 1:1 mixture of the HIGH and LOW solutions described by Table 3) against a free-flow double-junction reference electrode at 37° C. (The data highlighted in red was used for the linear fit shown in black.).

Long-term Stability in Artificial Blood Electrolyte Solution. To test the long-term stability of reference electrodes with Fluorosilicone 1 membranes, their emf was tested in a 1:1 mixture of HIGH and LOW solution (see Table 3) in a temperature-controlled box at 37° C. The drift over 8 days was only −88±59 µV/h (n=3), with the best performing electrode giving a drift of only 20 µV/h (see FIG. 4). The reference electrodes were also tested for long-term stability in tenfold diluted animal serum solution (37° C.). Over 5.8 days, a drift of 112±26 µV/h (n=3) was observed, which is within error the same as for measurements in artificial electrolyte solutions. For comparison, Fluorosilicone 1 reference membranes doped with [C$_8$mim$^+$][NTf$_2^-$] tested with a conventional electrode setup with an inner filling solution gave a drift of 27±14 µV/h (n=3) over 3 days in artificial blood electrolyte solution. This suggests that additional improvements in the fabrication may further reduce the drift of the solid-contact reference electrodes.

Figure 5:
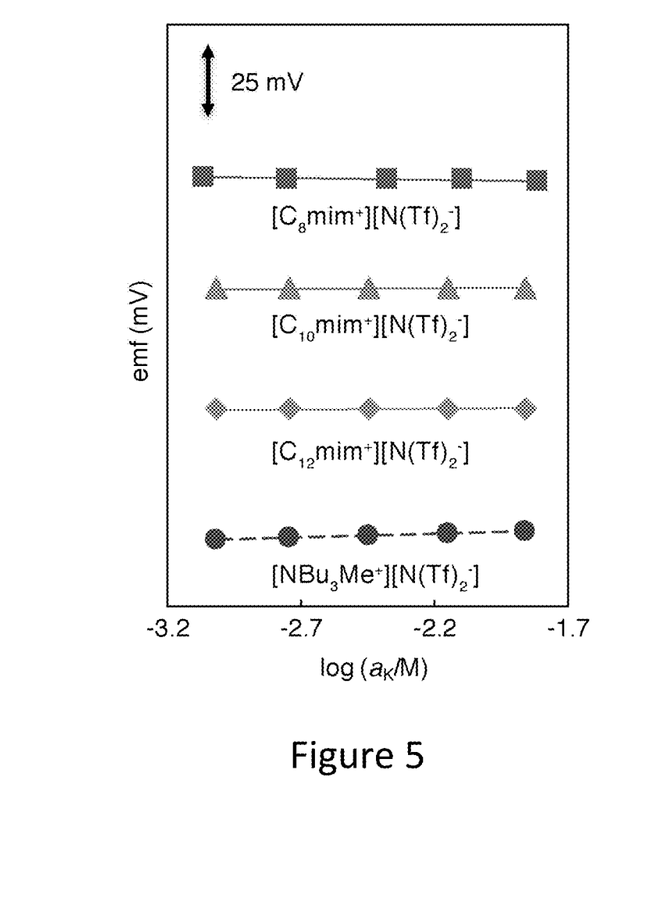
FIG. 5 shows the potential responses of reference electrodes with Fluorosilicone 1 membranes doped with [$C_8mim^+$][$NTf_2^-$], [$C_{10}mim^+$][$NTf_2^-$], [$C_{12}mim^+$][$NTf_2^-$], or [$NBu_3Me^+$][$NTf_2^-$] in the 1.0 to 16 mM KCl range. Average slopes and standard deviations of linear regressions are shown in Table 4.

Comparison of Reference Membranes doped with Different Ionic Liquids. In view of possible further improvements in potential stability, we carried out experiments with Fluorosilicone 1 reference membranes doped with several other ionic liquids. Key requirements to make ionic liquids suitable for use in reference electrodes membranes are a moderate hydrophobicity and chemical stability of both the cation and anion.[47] To this end, three other ionic liquids were chosen for further work: [C$_{10}$mim$^+$][NTf$_2^-$] and [C$_{12}$mim$^+$][NTf$_2^-$] differ from [C$_8$mim$^+$][NTf$_2^-$] only in the length of the alkyl chain of the cation, and [NBu$_3$Me$^+$][NTf$_2^-$] shares the same anion with the other ionic liquids but has a tetraalkylammonium instead of a imidazolium cation. To test these Fluorosilicone 1 reference electrodes, their potential was again determined in the 1.0 to 16 mM KCl range. EMF results are shown in FIG. 5 and potential stability characteristics are summarized in Table 4.

TABLE 4

Effect of KCl on EMF of Reference Electrodes with Fluorosilicone 1 Membranes Doped with Different Ionic Liquids.

| Ionic liquid | Slope of linear regression (mV/decade) [a] | Standard ion-transfer potential, $\Delta^w_{DCE}\phi^\circ_i$ (V) [b] | Potential change over the physiological K[+] range (mV) [c] |
|---|---|---|---|
| [NBu$_3$Me$^+$][NTf$_2^-$] | 2.1 ± 0.4 | −0.105 | 0.27 |
| [C$_8$mim$^+$][NTf$_2^-$] | −1.5 ± 0.7 | −0.113 | 0.19 |
| [C$_{10}$mim$^+$][NTf$_2^-$] | −0.4 ± 0.6 | −0.190 | 0.05 |
| [C$_{12}$mim$^+$][NTf$_2^-$] | 0.2 ± 0.3 | −0.220 | 0.03 |

[a] Average and standard deviation of the slope of emf responses to KCl in the 1.0 to 16 mM activity range (n = 4, except for n = 3 for [NBu$_3$Me$^+$][NTf$_2^-$]).
[b] Experimental standard potential for ion transfer from water to 1,2-dichloroethane.
[b] Physiological K[+] range: 3.5 to 4.7 mM.

Over the entire tested range of KCl concentrations, the effect of KCl on the reference potential provided by the three types of reference membranes doped with [C$_8$mim$^+$][NTf$_2^-$], [C$_{10}$mim$^+$][NTf$_2^-$], and [C$_{12}$mim$^+$][NTf$_2^-$] was minimal. It may appear that [C$_{12}$mim$^+$][NTf$_2^-$], which has the longest alkyl chain and is the most hydrophobic of these three ionic liquids, afforded the smallest variability of the reference potential, but superiority of the [C$_{12}$mim$^+$][NTf$_2^-$]-based over the [C$_{10}$mim$^+$][NTf$_2^-$]-based reference electrode cannot be confirmed with statistical significance.

Fluorosilicone 1 reference membranes doped with [C$_{10}$mim$^+$][NTf$_2^-$] and [C$_{12}$mim$^+$][NTf$_2^-$] were also tested over five days for their long-term stability. Similar drifts as for the membranes doped with [C$_8$mim$^+$][NTf$_2^-$] were observed, showing here too the differences among the [C$_8$mim$^+$][NTf$_2^-$], [C$_{10}$mim$^+$][NTf$_2^-$], and [C$_{12}$mim$^+$][NTf$_2^-$]-based reference electrodes to be minimal. This is consistent with the conclusion that the long-term stability may have been less influenced by the ionic liquid but more by other factors, such as the variability of the solid contact, minor fluctuations of the half-cell potential of the free-flow double-junction reference electrode with respect to which these new reference electrodes were tested, or variability in sample flow conditions.

While medical grade silicones are used in many medical devices, the ionic liquid too must be considered when assessing the biocompatibility of membrane-based reference electrodes. Unfortunately, toxicology data for ionic liquids are still few, and most available studies focused on cytotoxicity. In one of the few investigations of the toxicity of ionic liquids for mammals, an acute oral median lethal dose (LD$_{50}$) of 3150 μmol/kg body weight was reported for 1-butyl-3-methylimidazolium chloride in female rats. Considering the typical amount of membrane material used in a reference membrane (e.g., 12 mg silicone polymer and 3 mg ionic liquid) and assuming a worst case scenario in which the ionic liquid of an individual sensor leaches out completely over a short period, a concentration of the ionic liquid of 0.08 μmol/kg body weight would be obtained for a human exposed to this sensor.

CONCLUSIONS

Reference electrodes fabricated from biocompatible materials and used in wearable and implantable sensors may serve an important role in clinical diagnostics and health monitoring of the future. This work demonstrates that silicones are suitable matrixes for ionic liquid-doped reference membranes. Silicones are particularly promising for this application because they do not require a plasticizer and are available in a range of biocompatible, commercially available varieties. Use of Fluorosilicone 1 doped with [C$_8$mim$^+$][NTf$_2^-$], [C$_{10}$mim$^+$][NTf$_2^-$], or [C$_{12}$mim$^+$][NTf$_2^-$] provides stable and sample-independent potentials in solutions that contain electrolytes in concentrations representative for a wide range of blood samples. In long-term stability tests, the electrodes exhibited potential drifts as low as 20 μV/h over 8 days in artificial blood electrolyte solution and 112 μV/h over 5.8 days in 10% animal serum.

ILLUSTRATIVE EMBODIMENTS

Illustrative embodiments include Embodiment 1 that includes a reference electrode including a solid electron conductor; an interlayer; and a polymeric membrane layer comprising a polymer composition, the polymer composition comprising at least one silicone-containing polymer and at least one ionic liquid, wherein the polymeric membrane layer and the polymer composition are essentially plasticizer free and the silicone-containing polymer and the ionic liquid are miscible as determined using a thermodynamic method that shows a single glass transition temperature (TO of a composition including the at least one silicone-containing polymer and the at least one ionic liquid, wherein the interlayer is disposed between the solid electron conductor and the polymeric membrane layer.

Embodiment 2 demonstrates additional illustrative embodiments that include Embodiment 1, wherein the ionic liquid comprises at least one imidazolium cation or quaternary ammonium cation group; and an anion comprising a bis(perfluoroalkylsulfonyl)imide, an alkyl(perfluoroalkyl)sulfonylimide, a bis(alkylsulfonyl)imide, or a bis(alkylsulfonyl)imide anion with one or more ether, ester or amide groups interrupting the alkyl chain.

Embodiment 3 demonstrates additional illustrative embodiments that include Embodiment 1 or 2, wherein the ionic liquid is selected from 1-methyl-3-octylimidazolium bis(trifluoromethylsulfonyl)imide ([C$_8$mim$^+$][NTf$_2^-$]), 1-methyl-3-decylimidazolium bis(trifluoromethylsulfonyl)imide ([C$_{10}$mim$^+$][NTf$_2^-$]), 1-methyl-3-dodecylimidazolium bis(trifluoromethylsulfonyl)imide ([C$_{12}$mim$^+$][NTf$_2^-$]), tributylmethylammonium bis(trifluoromethylsulfonyl)imide ([NBu$_3$Me$^+$][NTf$_2^-$]), and combinations thereof.

Embodiment 4 demonstrates additional illustrative embodiments that include any of Embodiments 1 to 3, wherein the polymer composition has from 5 to 75 wt % of the ionic liquid based on the total weight of the polymer composition.

Embodiment 5 demonstrates additional illustrative embodiments that include any of Embodiments 1 to 3, wherein the polymer composition has from 10 to 40 wt % of the ionic liquid based on the total weight of the polymer composition.

Embodiment 6 demonstrates additional illustrative embodiments that include any of Embodiments 1 to 3, wherein the polymer composition has from 10 to 30 wt % of the ionic liquid based on the total weight of the polymer composition.

Embodiment 7 demonstrates additional illustrative embodiments that include any of Embodiments 1 to 3, wherein the at least one silicone-containing polymer has a glass transition temperature lower than room temperature.

Embodiment 8 demonstrates additional illustrative embodiments that include any of Embodiments 1 to 7, wherein the at least one silicone-containing polymer is polysiloxane-based.

Embodiment 9 demonstrates additional illustrative embodiments that include any of Embodiments 1 to 8, wherein the at least one silicone-containing polymer is a polysiloxane-based fluorine-containing polymer, a polysiloxane-based methyl group-containing polymer, a polysiloxane-based cyano group-containing polymer, or a combination thereof.

Embodiment 10 demonstrates additional illustrative embodiments that include any of Embodiments 1 to 9, wherein the at least one silicone-containing polymer is poly([3,3,3-trifluoropropyl]methylsiloxane).

Embodiment 11 demonstrates additional illustrative embodiments that include any of Embodiments 1 to 10, wherein the polymer composition has from 5 to 50 wt % of the polymer based on the total weight of the polymer composition.

Embodiment 12 demonstrates additional illustrative embodiments that include any of Embodiments 1 to 10, wherein the polymer composition has from 10 to 40 wt % of the polymer based on the total weight of the polymer composition.

Embodiment 13 demonstrates additional illustrative embodiments that include any of Embodiments 1 to 10, wherein the polymer composition has from 10 to 30 wt % of the polymer based on the total weight of the polymer composition.

Embodiment 14 demonstrates additional illustrative embodiments that include any of Embodiments 1 to 13, wherein the polymer composition further comprises at least one kind of inorganic filler.

Embodiment 15 demonstrates additional illustrative embodiments that include Embodiment 14, wherein the at least one kind of inorganic filler is selected from a group consisting of silica and titanium dioxide.

Embodiment 16 demonstrates additional illustrative embodiments that include any of Embodiments 1 to 15, wherein the thermodynamic method to determine the $T_g$ is selected from differential scanning calorimetry (DSC), thermogravimetric analysis (TGA), scanning electron microscopy (SEM), thermal mechanical analysis (TMA), dynamic mechanical analysis (DMA), and dielectric thermal analysis (DETA).

Embodiment 17 demonstrates additional illustrative embodiments that include any of Embodiments 1 to 15, wherein the thermodynamic method to determine the $T_g$ is differential scanning calorimetry (DSC).

Embodiment 18 demonstrates additional illustrative embodiments that include any of Embodiments 1 to 17, wherein the reference membrane is solvent cast, spin-coated, dip-coated, or inkjet-printed from the polymer composition.

Embodiment 19 demonstrates additional illustrative embodiments that include any of Embodiments 1 to 18, wherein the solid electron conductor comprises silver, gold, platinum, copper, stainless steel, carbon, indium-tin-oxide (ITO), fluorine-doped tin oxide (FTO) or aluminum.

Embodiment 20 demonstrates additional illustrative embodiments that include any of Embodiments 1 to 19, wherein the reference electrode provides sample-independent and long-term stable electric potential in the range of ion concentrations regularly found in saliva, urine, interstitial fluid, blood, blood serum, or sweat at room or body temperature.

Embodiment 21 includes an electrochemical measurement system using the reference electrode described in any of Embodiments 1 to 20.

One skilled in the art will appreciate that the methods and compositions described herein can be practiced with embodiments other than those disclosed. The disclosed embodiments are presented for purposes of illustration and not limitation. One will also understand that components of the methods depicted and described with regard to the figures and embodiments herein may be interchangeable.

The invention claimed is:

1. A reference electrode comprising:
    a solid electron conductor;
    an interlayer; and
    a polymeric membrane layer comprising a polymer composition, the polymer composition comprising at least one silicone-containing polymer and at least one ionic liquid, wherein the polymeric membrane layer and the polymer composition are essentially plasticizer free and the at least one silicone-containing polymer and the at least one ionic liquid are miscible,
    wherein the interlayer is disposed between the solid electron conductor and the polymeric membrane layer.

2. The reference electrode according to claim 1, wherein the ionic liquid comprises at least one imidazolium cation or quaternary ammonium cation group; and an anion comprising a bis(perfluoroalkylsulfonyl)imide, an alkyl(perfluoroalkyl)sulfonylimide, a bis(alkylsulfonyl)imide, or a bis(alkylsulfonyl)imide anion with one or more ether, ester or amide groups interrupting the alkyl chain.

3. The reference electrode according to claim 1, wherein the ionic liquid is selected from 1-methyl-3-octylimidazolium bis(trifluoromethylsulfonyl)imide ($[C_8mim^+][NTf_2^-]$), 1-methyl-3-decylimidazolium bis(trifluoromethylsulfonyl)imide ($[C_{10}mim^+][NTf_2^-]$), 1-methyl-3-dodecylimidazolium bis(trifluoromethylsulfonyl)imide ($[C_8mim^+][NTf_2^-]$), tributylmethylammonium bis(trifluoromethylsulfonyl)imide ($[NBu_3Me^+][NTf_2^-]$), and combinations thereof.

4. The reference electrode according to claim 1, wherein the polymer composition has from 5 to 75 wt % of the ionic liquid based on the total weight of the polymer composition.

5. The reference electrode according to claim 1, wherein the polymer composition has from 10 to 40 wt % of the ionic liquid based on the total weight of the polymer composition.

6. The reference electrode according to claim 1, wherein the polymer composition has from 10 to 30 wt % of the ionic liquid based on the total weight of the polymer composition.

7. The reference electrode according to claim 1, wherein the at least one silicone-containing polymer has a glass transition temperature lower than 20° C.

8. The reference electrode according to claim 1, wherein the at least one silicone-containing polymer is polysiloxane-based.

9. The reference electrode according to claim 1, wherein the at least one silicone-containing polymer is a polysiloxane-based fluorine-containing polymer, a polysiloxane-based methyl group-containing polymer, a polysiloxane-based cyano group-containing polymer, or a combination thereof.

10. The reference electrode according to claim 1, wherein the at least one silicone-containing polymer is poly([3,3,3-trifluoropropyl]methylsiloxane).

11. The reference electrode according to claim 1, wherein the polymer composition has from 5 to 50 wt % of the polymer based on the total weight of the polymer composition.

12. The reference electrode according to claim 1, wherein the polymer composition has from 10 to 30 wt % of the polymer based on the total weight of the polymer composition.

13. The reference electrode according to claim 1, wherein the polymer composition further comprises at least one kind of inorganic filler.

14. The reference electrode according to claim 13, wherein the at least one kind of inorganic filler is selected from a group consisting of silica and titanium dioxide.

15. The reference electrode according to claim 1, wherein a composition consisting essentially of the at least one silicone-containing polymer and the at least one ionic liquid has a single glass transition temperature ($T_g$) according to a thermodynamic method is selected from differential scanning calorimetry (DSC), thermogravimetric analysis (TGA), scanning electron microscopy (SEM), thermal mechanical analysis (TMA), dynamic mechanical analysis (DMA), and dielectric thermal analysis (DETA).

16. The reference electrode according to claim 15, wherein the thermodynamic method is differential scanning calorimetry (DSC).

17. The reference electrode according to claim 1, wherein the polymeric membrane is solvent cast, spin-coated, dip-coated, or inkjet-printed from the polymer composition.

18. The reference electrode according to claim 1, wherein the solid electron conductor comprises silver, gold, platinum, copper, stainless steel, carbon, indium-tin-oxide (ITO), fluorine-doped tin oxide (FTO) or aluminum.

19. The reference electrode according to claim 1, wherein the reference electrode provides sample-independent and long-term stable electric potential of a potassium ion concentration at 4.1 mM.

20. An electrochemical measurement system comprising the reference electrode described in claim 1.

* * * * *